United States Patent [19]

Delatte

[11] Patent Number: 4,718,481
[45] Date of Patent: Jan. 12, 1988

[54] FLUID HEATING APPARATUS

[75] Inventor: Daniel Delatte, Saint Maur, France

[73] Assignee: L'Air Liquide, Societe Anonyme pour l'Etude et l'Exploitation des Procedes Georges Claude, Paris, France

[21] Appl. No.: 785,565

[22] Filed: Oct. 8, 1985

[30] Foreign Application Priority Data

Oct. 17, 1984 [FR] France ............... 84 15882

[51] Int. Cl.⁴ .................. F28F 13/06; F17C 7/02
[52] U.S. Cl. .................. 165/108; 165/78; 165/163; 122/31 R; 62/52
[58] Field of Search ............... 261/124, 155; 165/117, 165/78, 160, 163, 108, 109, 908; 122/31 R; 62/52, 53

[56] References Cited

U.S. PATENT DOCUMENTS

| | | | |
|---|---|---|---|
| 1,622,024 | 3/1927 | Canter | 165/117 |
| 1,716,681 | 6/1929 | Beckman | 165/117 |
| 1,912,651 | 6/1933 | Nusbaum | 165/117 X |
| 2,081,432 | 5/1932 | Hapgood | 165/108 |
| 3,022,985 | 2/1962 | Main | 122/31 R X |
| 3,146,609 | 9/1964 | Engalitcheff, Jr. | 165/117 X |
| 3,712,272 | 1/1973 | Carnaros et al. | 165/78 X |
| 3,738,353 | 6/1973 | Santoleri | 165/39 X |
| 4,201,262 | 5/1980 | Goldstein | 165/117 |
| 4,203,300 | 5/1980 | Hanson et al. | 62/52 |
| 4,415,024 | 11/1983 | Baker | 165/78 X |
| 4,440,698 | 4/1984 | Bloomer | 261/155 X |

FOREIGN PATENT DOCUMENTS

| | | | |
|---|---|---|---|
| 427659 | 3/1924 | Fed. Rep. of Germany | 122/31 R |
| 2145385 | 2/1973 | France | 165/117 |
| WO79/00056 | 7/1978 | PCT Int'l Appl. | 165/117 |

Primary Examiner—Albert W. Davis, Jr.
Assistant Examiner—Peggy Neils
Attorney, Agent, or Firm—Young & Thompson

[57] ABSTRACT

A water injection device having a plurality of superposed pipes (13), and a series of tubes (5) for circulating the fluid to be heated, are disposed inside a cylindrical case (6). Interconnecting devices are fixed to the injection device and support the series of tubes, to make the injection device and series of tubes a structurally independent, removable unit. The apparatus is useful for vaporization and heating by circulation of water of liquefied gasses at low temperature such as nitrogen, oxygen, hydrogen, argon, etc.

16 Claims, 4 Drawing Figures

FLUID HEATING APPARATUS

The present invention relates to a fluid heating apparatus of the type comprising a case in which are mounted a heating fluid injection device including at least one perforated rack, and a group of tubes for the circulation of the fluid to be treated.

An object of the invention is to provide an apparatus of this type whose construction is particularly cheap.

For this purpose, the invention provides a heating apparatus of the aforementioned type, wherein the injection device constitutes a support frame for the tubes.

According to advantageous features of the invention:

The injection device is disposed in a median vertical plane of the case. This is the optimum arrangement from the point of view of mechanical stresses to which the injection device is subjected.

When the apparatus has a plurality of layers of tubes, the injection device has a plurality of superimposed racks adapted to inject different flows of heating fluid. Thus it is possible to regulate in an optimum manner the amount of heat provided at each level of the case.

Each rack has on each side a row of perforations. In this way very strong turbulences are created in the case, which facilitates the heat exchange.

The injection device is provided with rollers adapted to roll and be guided in guide means provided in the case. This enables the whole of the apparatus to be mounted in its final horizontal position, without the use of hoisting machines.

When the heating fluid is water or steam, the case has in its upper part a water discharging overflow consisting of a tube which extends into the case to a certain height. The case then constitutes an expansion vessel which automatically absorbs variations in the flow of heating water.

The case comprises a cylindrical sleeve and two end walls which are for example crowned. This facilitates the construction of the appratus and enables it to be operated under a pressure higher than atmospheric pressure.

An embodiment of the invention will now be described with reference to the accompanying drawings in which.

Figure 1:
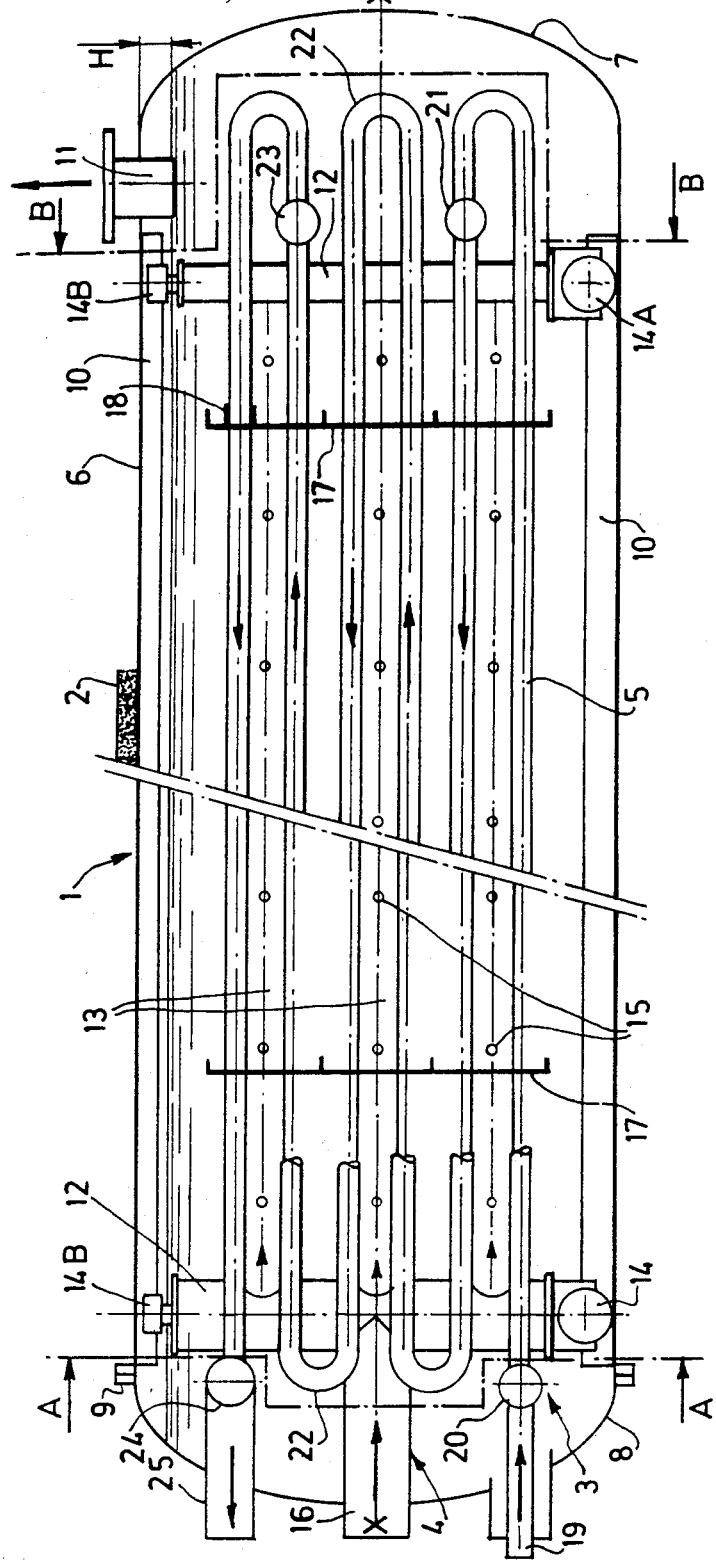
FIG. 1 is an elevational view of a heating apparatus according to the invention, the case having been partly removed so as to show the inner arrangement of the apparatus.
Figure 2:
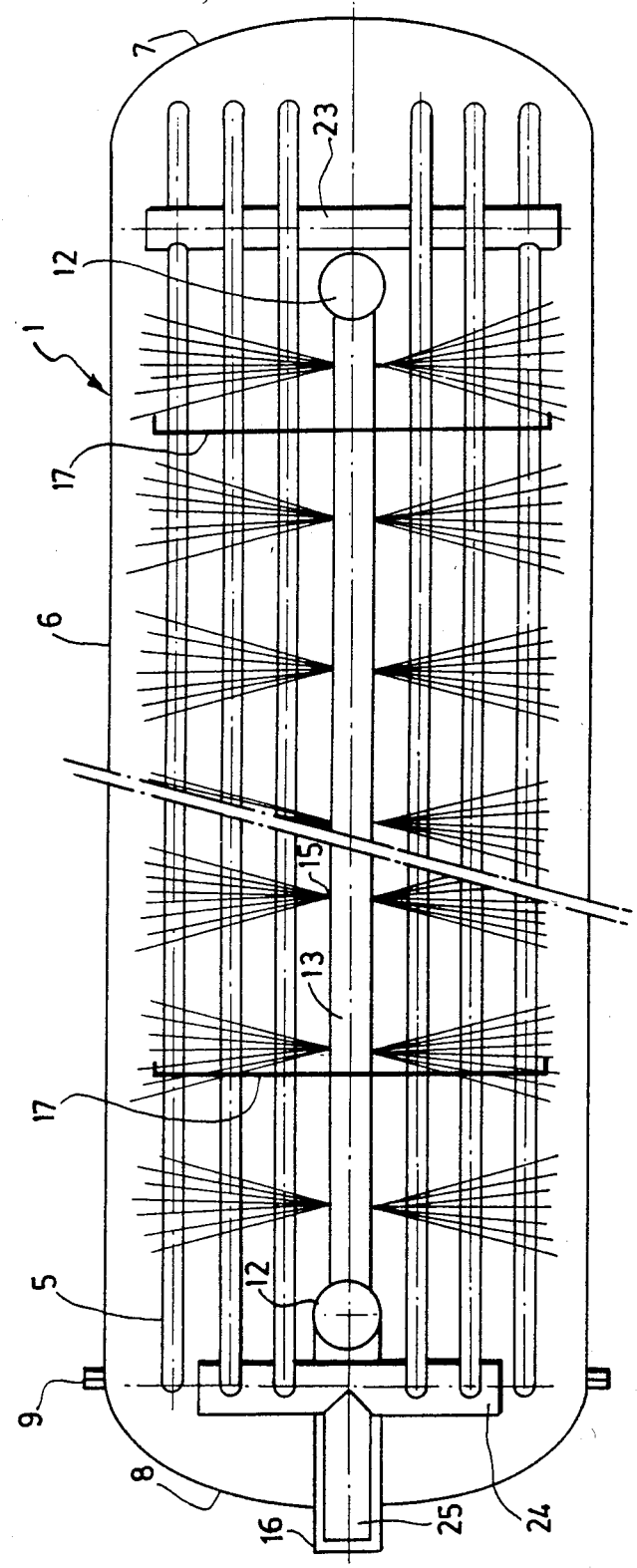
FIG. 2 is a top plan view of the same apparatus with a part of the case removed.
Figure 3:
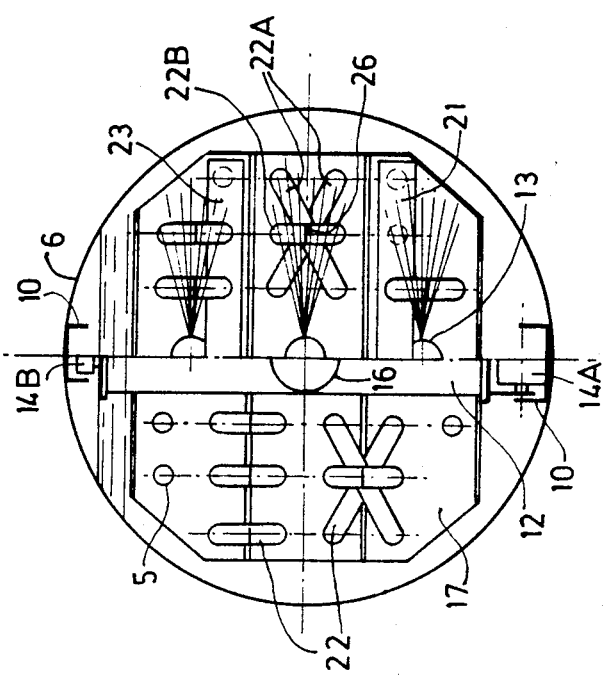
FIG. 3 is, in its left half, a semi end elevational and sectional view taken along the broken line A—A of FIG. 1 and, in its right half, a semi end elevational and a sectional view taken along the broken line B—B of FIG. 1.

The heating device shown in FIGS. 1 through 3 is adapted to vaporize and then heat a cryogenic liquid such as liquid nitrogen, liquid oxygen, liquid hydrogen, liquid argon, etc. This apparatus comprises a case 1, optionally provided with a heat insulation 2, which contains a rigid unit 3 mainly comprising a heating water injection device 4 and a series of tubes 5 for the circulation of the fluid to be heated.

The case 1 comprises a cylindrical sleeve 6 having a horizontal axis X—X closed by two crowned end walls 7 and 8, the end wall 7 being permanently welded and the end wall 8 being fixed in a detachable and sealed manner by an assembly comprising flanges 9 and bolts. The U-section iron members 10 are fixed by their web to the upper and lower generatrices of the sleeve 6 inside the latter, and an overflow tube 11 extends through the sleeve in its upper part close to the end wall 7, this tube extending to a short depth H inside the sleeve.

The injection device 4 is completely contained in the median vertical plane of the case 1, i.e. in the vertical plane containing the axis X—X. This device consists of two vertical hollow posts 12 interconnected by three horizontal pipes 13. Each of the posts 12, which are closed at each end, is provided with a lower roller 14A having a horizontal axis and adapted to roll along the web of the U-section member 109 in the lower part of the sleeve 6, and an upper roller 14B having a vertical axis and adapted to be guided by the flanges of the upper U-section member 10. The pipes 13 have on each side a row of perforations 15 contained in their horizontal diametrical plane, and each of them thus constitutes a unit for injecting water into the apparatus; a water supply pipe 16 extends through the end wall 8 along the axis X—X and is connected to the adjacent post 12. In the right half of FIG. 3, the corresponding post has been removed in order to illustrate the operation of the apparatus, which will be described hereinafter.

Fixed to the three pipes 13 by welding is a plurality of support plates 17 the contour (FIG. 3) of which roughly matches the interior contour of the sleeve 6 with a large clearance. These plates are provided with as many openings as there are tubes 5; each of these openings is provided with a flange 18 one of which is illustrated in FIG. 1 with a tube 5 extending freely therethrough.

The tubes 5 are arranged in a plurality of horizontal layers, namely six layers in the illustrated embodiment. The number of tubes in each layer is so chosen as to take into account the evolution of the fluid treated and to utilize in the best possible manner the available space within the sleeve 6. Thus, the layers comprise, from the bottom to the top: two tubes in the relatively narrow lower region of the sleeve; four times six tubes in the wider mean region; and four tubes in the upper narrower region.

The cryogenic liquid to be vaporized enters by way of a pipe 19 which extends through the end wall 8 and leads to a first transverse manifold 20 which distributes the liquid in the two tubes of the lower layer. The liquid thus starts to vaporize and reaches, at the other end of the sleeve, a second transverse manifold 21 which distributes the fluid in the six tubes of the second layer. Thereafter, the fluid travels through the four mean layers, this fluid changing direction at each end of the sleeve in elbows 22. The fluid then enters a third transverse manifold 23, disposed above the manifold 21, which distributes the fluid in the four tubes of the upper layer. The fluid then arrives, at the desired temperature of utilization, for example at the surrounding temperature, at a fourth transverse manifold 24 which is disposed above the manifold 20, and enters a discharge pipe 25 which extends through the end wall 8.

Figure 4:
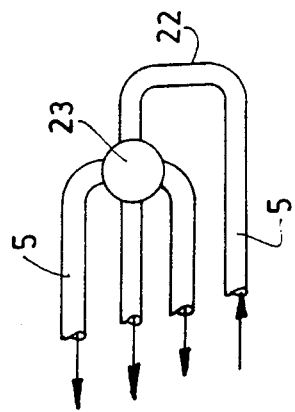
FIG. 4 is a partial view of a modification.

The pipes 16, 19, and 25 are welded to the end wall 8 and are therefore part of the unit 3, mentioned hereinbeofre, with this end wall 8. Further, the manifolds 20, 21, 23, and 24 not only have for function to distribute the treated fluid from one layer to another layer having a different number of tubes but also to damp the pulsations of the cryogenic liquid supply. For this reason, there may be added other transverse manifolds performing merely this damping function. It will be observed that, between the lower layer and the second layer, the fluid, in vaporizing, increases in volume so that the passage from two to six tubes is facilitated. On the other hand, in the upper part of the apparatus, the passage from six to four tubes, notwithstanding the continuing expansion of the fluid, produces an acceleration of its velocity of circulation. If, for a given application, the outlet velocity is considered excessive, the modificaiton shown in FIG. 4 may be used, in which the upper layer is subdivided into a plurality of layers each having less than six tubes and connected in parallel to the manifold 23.

As can be seen in FIG. 3, the tubes of some layers are connected to those of neighbouring layers by crossing elbows which may be connected to a manifold at one of their ends. This permits, for a given curvature of at least some of the elbows 22, a vertically closer spacing of the layers so that it is possible to increase the number of tubes 5 which may be placed in the sleeve 6. Now, it is known that the elbows produced by bending without welding cannot have a radius of curvature below a minimum radius of curvature without increasing the wall thickness of the tubes being bent. Thus, owing to the use of crossing elbows, it is possible to achieve a higher compactness of the bundle of tubes 5 while avoiding a large number of welds, namely those corresponding to the obliquely disposed elbows. In the unit illustrated in FIG. 3, four of the six tubes of the second, third, and fourth layers are thus interconnected by weldless oblique elbows 22A having a large radius of curvature, the remaining two tubes being connected by vertical elbows 22B having a small radius of curvature and a median weld 26. At each end of the sleeve 6 there can therefore be seen two groups of three crossing elbows (two elbows 22A, one elbow 22B) forming, when viewed in end elevation, a star having six branches. Many other configurations may of course be envisaged.

As can be seen in FIGS. 1 and 3, the perforations of the units 13 are at levels intermediate between the first and second, third and fourth, fifth and sixth layers. In operation, the heating water, which may be if desired previously heated by a suitable device (not shown), is introduced into the apparatus through the pipe 16, distriuted by the adjacent post 12 between the three units 13, and is injected on each side into the sleeve through the perforations roughly horizontally and between the layers of tubes 5. This produces an intense turbulence of the water contained in the apparatus which rises up to the level of the discharge overflow pipe 11. The latter may open on to a conduit for discharging water (lost water) or onto a conduit for recycling the water and provided with a circulating pump and, optionally, with a heating device.

Owing to the extent H to which the pipe 11 extends into the sleeve 6, a gaseous space is maintained in the apparatus; the latter thus forms an expansion vessel which automatically compensates for the variations in the water supply flow.

Note that the diameter and/or the number of perforations 15 of each unit 13 may be so chosen as to adapt the flow of water injected by each rack to the needs of heat at the corresponding level.

The construction of the apparatus is particularly convenient: the cylindrical case is easy and cheap to produce and is capable of itself withstanding a possible operation under a pressure higher than atmospheric pressure with no need for any reinforcing element; the unit 3 may be constructed flat on the ground and then passed into the assembly comprising the sleeve 6 and the end wall 7 by rolling the rollers 14A and 14B in the U-section members 10.

By way of a modification, the apparatus may be employed with steam as the heating fluid. In this case, only the lower unit 13 is perforated and the posts 12 are closed just above this rack. After having filled the apparatus with water, the steam is injected through this lower rack and is condensed while strongly stirring the mass of water, the excess water being discharged through the pipe 11, as before.

It will be understood that, as is conventional in this technique, additional tubes 5 may be provided for rapidly putting the reservoir storing the cryogenic liquid under pressure.

What is claimed:

1. A fluid heating apparatus comprising a case, a heating fluid injection device mounted in the case and having at least one perforated pipe, a group of tubes disposed in the case for circulating the fluid to be treated, and interconnecting means supported by said injection device independently of said case and supporting said group of tubes for movement relative to said case, whereby said group of tubes is supported by said injection device via said interconnecting means as a unit that is insertable into and removable from the case, and a liquid discharging overflow in an upper portion of the case at an elevation to maintain said injection device and said tubes immersed in a liquid that originates as said heating fluid.

2. An apparatus according to claim 1, wherein the injection device is disposed in a median vertical plane of the case.

3. An apparatus according to claim 2, having a plurality of layers of tubes, the injection device having a plurality of superimposed pipes.

4. An apparatus according to claim 2, wherein said at least one pipe has on each side a row of perforations.

5. An apparatus according to claim 2, comprising a plurality of said pipe, each said pipe having on each side thereof a row of perforations.

6. An apparatus according to claim 4, wherein each row of perforations is in facing relation to a gap between two superimposed layers of tubes.

7. An apparatus according to claim 1, wherein said interconnecting means is a plurality of transverse support plates provided with openings and fixed to the injection device, the tubes slidably extending through the openings.

8. An apparatus according to claim 1, wherein the injection device is provided with rollers adapted to roll and be guided in guide means provided in the case.

9. An apparatus according to claim 1, wherein the case comprises a cylindrical sleeve and two end walls.

10. An apparatus according to claim 9, wherein the end walls are crowned.

11. An apparatus according to claim 9, comprising a plurality of layers of tubes, the number of tubes of each layer being adapted to occupy the major part of the corresponding width of the sleeve and horizontal manifolds interconnecting at least successive layers having different numbers of tubes.

12. An apparatus according to claim 11, wherein the layers of tubes which are closest to the outlet of the heating fluid are connected in parallel.

13. An apparatus according to claim 1, comprising a plurality of horizontal layers of tubes, horizontally offset tubes of at least two layers being interconnected by crossing elbows.

14. Fluid heating apparatus comprising a case, at least two horizontal layers of tubes disposed in said case for circulating the fluid to be treated, said tubes being immersed in a heating liquid, and a horizontal pipe having a plurality of perforations on opposite horizontal sides thereof for injecting heating fluid from which said heating liquid originates, said pipe being disposed at a horizontal level between said at least two horizontal layers of tubes.

15. Fluid heating apparatus comprising a cylindrical case having a central longitudinal axis, a heating fluid injection device in the case, and a plurality of vertically spaced superposed horizontal layers of tubes extending parallel to said axis and immersed in a heating liquid, each said horizontal layer of tubes having a number of tubes proportional to the width of said case at said layer, at least one first lower layer having a first number of tubes, at least one second higher layer having a second number of tubes greater than said first number, and at least third and fourth still higher layers having a third and a fourth number of tubes, respectively, both smaller than said second number; fluid inlet means connected to said first layer of tubes; heated fluid outlet means connected to said third and fourth layers of tubes in parallel; first manifold means interconnecting said first and second layers; and second manifoled means interconnecting said second layer in parallel to said third and said fourth layers.

16. Fluid heating apparatus comprising a case, a heating fluid injection device mounted in said case and having at least one perforated pipe for injecting a heating fluid into said case, and a plurality of vertically spaced apart superposed horizontal layers of tubes disposed in said case for circulating the fluid to be treated, wherein horizontally offset tubes of at least two adjacent superposed layers are interconnected by crossing elbows.

* * * * *